United States Patent [19]

Savigny

[11] Patent Number: 5,478,183

[45] Date of Patent: Dec. 26, 1995

[54] ARTICLE SELECTOR AND METHOD

[76] Inventor: Marc L. Savigny, 213 Yam Gandy Rd., Savannah, Ga. 31411

[21] Appl. No.: 274,382

[22] Filed: Jul. 13, 1994

[51] Int. Cl.⁶ ..................................... B65G 1/04
[52] U.S. Cl. ................ 414/276; 364/478; 414/268; 414/273; 414/277; 414/285; 186/49; 186/56; 186/69
[58] Field of Search ................ 364/478; 414/266, 414/267, 268, 269, 273, 274, 276, 277, 281, 285; 186/55, 56, 49, 2, 3, 69

[56] References Cited

U.S. PATENT DOCUMENTS

| | | | |
|---|---|---|---|
| 3,247,929 | 4/1966 | Langley | 414/276 X |
| 3,750,804 | 8/1973 | Lemelson | 414/276 |
| 3,822,025 | 7/1974 | Loos | 414/281 X |
| 4,239,436 | 12/1980 | Wildenaur | 414/276 |
| 4,589,811 | 5/1986 | Riccardo et al. | 414/276 X |
| 4,813,847 | 3/1989 | DeVries | 414/281 X |
| 5,025,140 | 6/1991 | Varley | 235/385 |
| 5,158,155 | 10/1992 | Domain et al. | 186/53 |
| 5,175,690 | 12/1992 | Berthier et al. | 364/478 |
| 5,186,281 | 2/1993 | Jenkins | 186/55 |

FOREIGN PATENT DOCUMENTS

| | | | |
|---|---|---|---|
| 430176 | 6/1991 | European Pat. Off. | 414/277 |
| 2555339 | 9/1983 | France . | |
| 12001 | 1/1984 | Japan | 414/285 |
| 267205 | 11/1991 | Japan | 414/276 |
| 4-286096 | 10/1992 | Japan . | |

OTHER PUBLICATIONS

The Way Things Work, David Macaulay 4 Page Brochure.

*Primary Examiner*—Frank E. Werner

[57] ABSTRACT

An article selecting and collecting apparatus having a plurality of vertically spaced elongated ramps with a continuous conveyor and articulated selector slidingly attached to a rail adjacent each conveyor. The articulated selector slides along the rail to a selected portion of the rack for selecting an article from the rack and placing it on the adjacent conveyor. The conveyor carries the article to a spiral chute at a distal end for collecting with other selected articles.

5 Claims, 4 Drawing Sheets

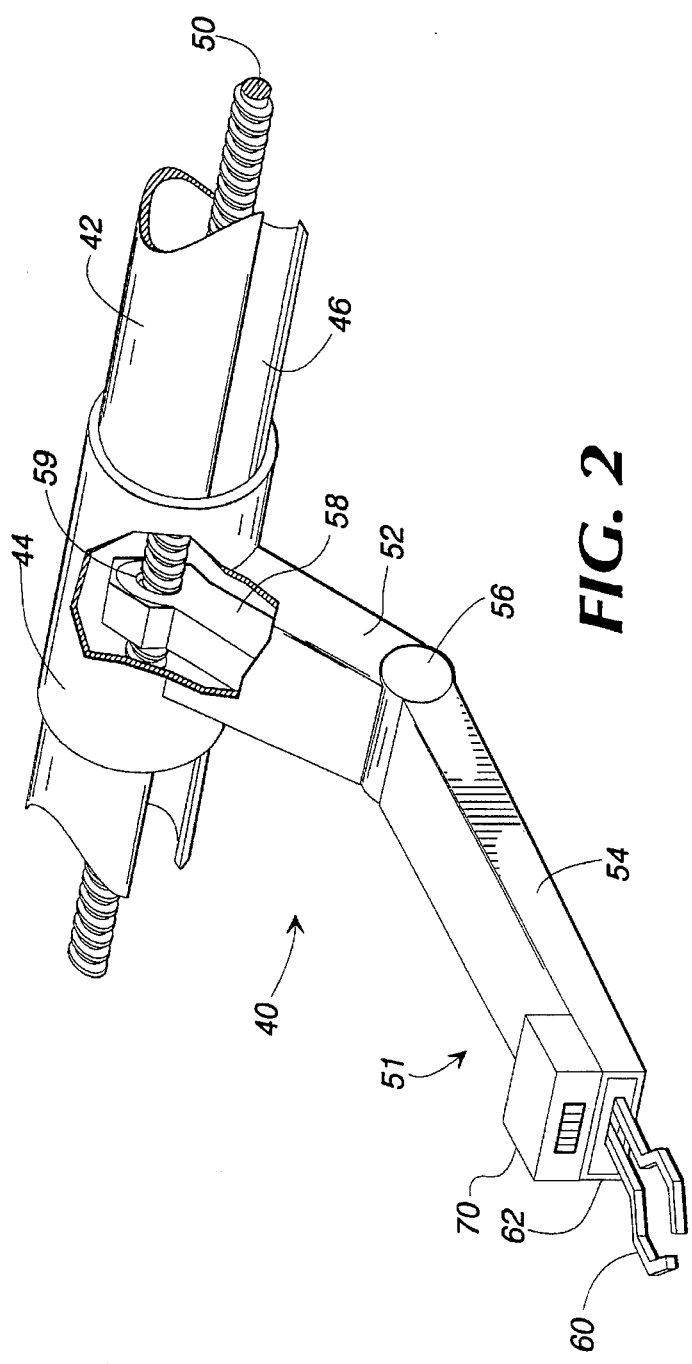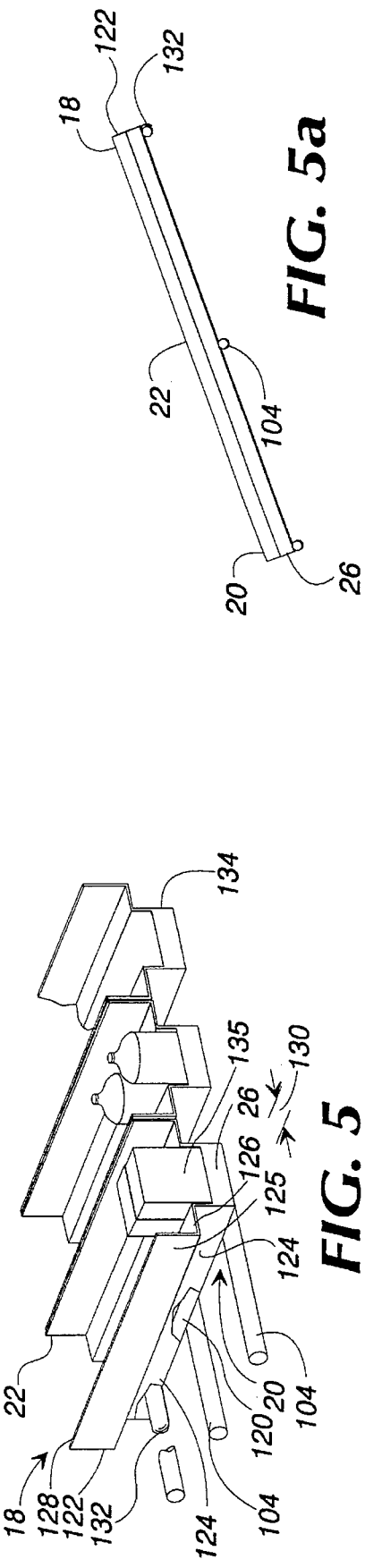

ARTICLE SELECTOR AND METHOD

TECHNICAL FIELD

The present invention relates to an article selecting and collecting apparatus. More particularly, the present invention relates to an apparatus and method for selecting articles from article-holding channels and conveying the articles to a collection point for gathering together with other selected articles.

BACKGROUND OF THE INVENTION

Conventional retail marketing of articles provides stores with large floor areas. Among these are department stores and discount stores that sell clothing and dry goods and supermarkets and grocery stores that sell items of food. These stores use various devices, such as racks, shelves, and tables, for holding articles to be selected and purchased by consumers. The racks, shelves, and tables are placed in the floor areas. The spaces between these devices define aisles for consumers to pass for selecting articles for purchase. The devices occupy a large proportion of the floor space. The racks, shelves and tables often are specialty devices designed for holding the particular articles. For example, tubular rings attached to stands hold garments on hangers. The racks have pegs that protrude for holding cards to which articles are attached. Other racks provide laterally extending shelves for supporting goods such as clothes, food articles, paper products, and the like.

Supermarkets, or grocery stores, are a common facility that have a number of elongated shelving for holding articles to be selected by consumers. The shelving is spaced apart to define aisles along which consumers pass to view and select articles held on the shelving. Each of the shelving typically includes a number of vertically-spaced horizontal shelves that extend laterally from a support. The articles to be selected are typically grouped with similar articles on the shelves. For example, soups are typically grouped together in one section of the store. Thus, consumers make select and pick from similar articles and goods offered by different manufacturers.

Conventional shopping, however, is time consuming. The consumer moves along the aisles selecting articles from the shelves. Some consumers are organized and have a list of articles for selection. Some consumers organize the list of goods by the layout of the store. Such grouping of goods, however, requires the consumer know the organization and layout of the store. Other consumers shop more casually by beginning at one point in the store and walking along the aisles selecting articles as they come across them. Often consumers recall the need to purchase an article in another area of the store and spend time retracing steps or walking along the aisles to locate the particular article in the store.

Such purchasing and shopping activities can be crowded and time consuming. Aisles may be crowded particularly during peak shopping hours. Check-out lines may further delay the shopping trip. Erroneous charges must be corrected and coupons have to be deducted. A recent study of two-career couples indicates that shopping adds stress to lives. About 64% of dual-income and 53% of single-income families in the United States said they have less time to shop now than five years ago. Shopping requires time that could otherwise be spent with children and at leisure. This study shows that in the United States, wives spend an average of 8.1 hours per week shopping, while their husbands shop for an average of 2.9 hours per week.

Accordingly, there is a need in the art for an improved apparatus for selecting articles for purchase to reduce the time and effort required to shop. It is to the provision of an improved article selecting and collecting apparatus that the present invention is primarily directed.

SUMMARY OF THE PRESENT INVENTION

The present invention meets the need in the art by providing an article picking and collecting apparatus and method that selects articles from a selected channels holding articles on vertically stacked ramps. The apparatus includes a frame of laterally-aligned pairs of vertical stanchions and vertically-spaced horizontal supports. The stanchions and supports are interconnected to define a plurality of vertically spaced ramps. The aligned pairs of horizontal supports in each ramp are vertically offset with respect to each other for orienting the ramps at a slope. A plurality of article-holding channels are disposed on the supports of each ramp, whereby the channels slope from a loading side to a removal side. Each channel includes side walls, a bottom, and a stop that extends upwardly from the bottom at the removal side. A continuous conveyor is disposed horizontally adjacent each ramp with a rail that extending longitudinally adjacent each ramp and is spaced-apart from the respective conveyor. An articulated picker is slidingly attached to each rail. A spiral chute is attached at one end of the frame and includes openings in a side wall for communication with the conveyors. The spiral chute is connected to a collector at a lower end of the spiral chute. Means are provided for operating a selected articulatable picker to slide longitudinally on the respective rail to a selected portion of the ramp to retrieve an article from one of the channels and place the article on the respective conveyor. In a preferred embodiment, an elongated screw is disposed along a longitudinal axis of the rail. A motor is selectively actuated to rotate the screw axially. An arm is connected to the picker and engages the thread of the screw. Axially rotating the screw drives the picker longitudinally relative to the rail. The picker is articulated to pick the article from the channel and place it on the adjacent conveyor. The selected article is carried on the conveyor to the spiral chute that connects with a collection area for gathering the article with other selected articles.

In a preferred embodiment, each of the article holding channels comprise a tray having a bottom, a pair of upwardly extending side walls, and a stop extending upwardly from an edge of the bottom. The tray attaches to the supports. In a preferred embodiment, the tray includes a curved hook attached to a lower surface of the tray. The hook engages one of the horizontal supports to hold the tray on the apparatus.

The present invention further provides a method of selecting and collecting articles from channels held on vertically spaced ramps. The steps of the method comprise scanning an identifier associated with the articles held in one of the channels on one of a plurality of vertically spaced ramps. The identifier is compared with a list of identifiers for articles to be selected to determine whether the article is to be removed from the channel for gathering with other selected articles. An articulated picker is operated to remove the article from the channel and place the article on a conveyor adjacent the ramp. The article is conveyed by the conveyor to a collection area and is grouped with other selected articles.

BRIEF DESCRIPTION OF THE DRAWINGS

FIG. 2 is a perspective view of an article selector and sliding member according to the present invention.

FIG. 5 illustrates an alternate embodiment in which trays define the channels for holding articles on the article selecting apparatus illustrated in FIG. 1.

FIG. 5a illustrates a side view of the tray illustrated in FIG. 5.

DETAILED DESCRIPTION

Figure 1:
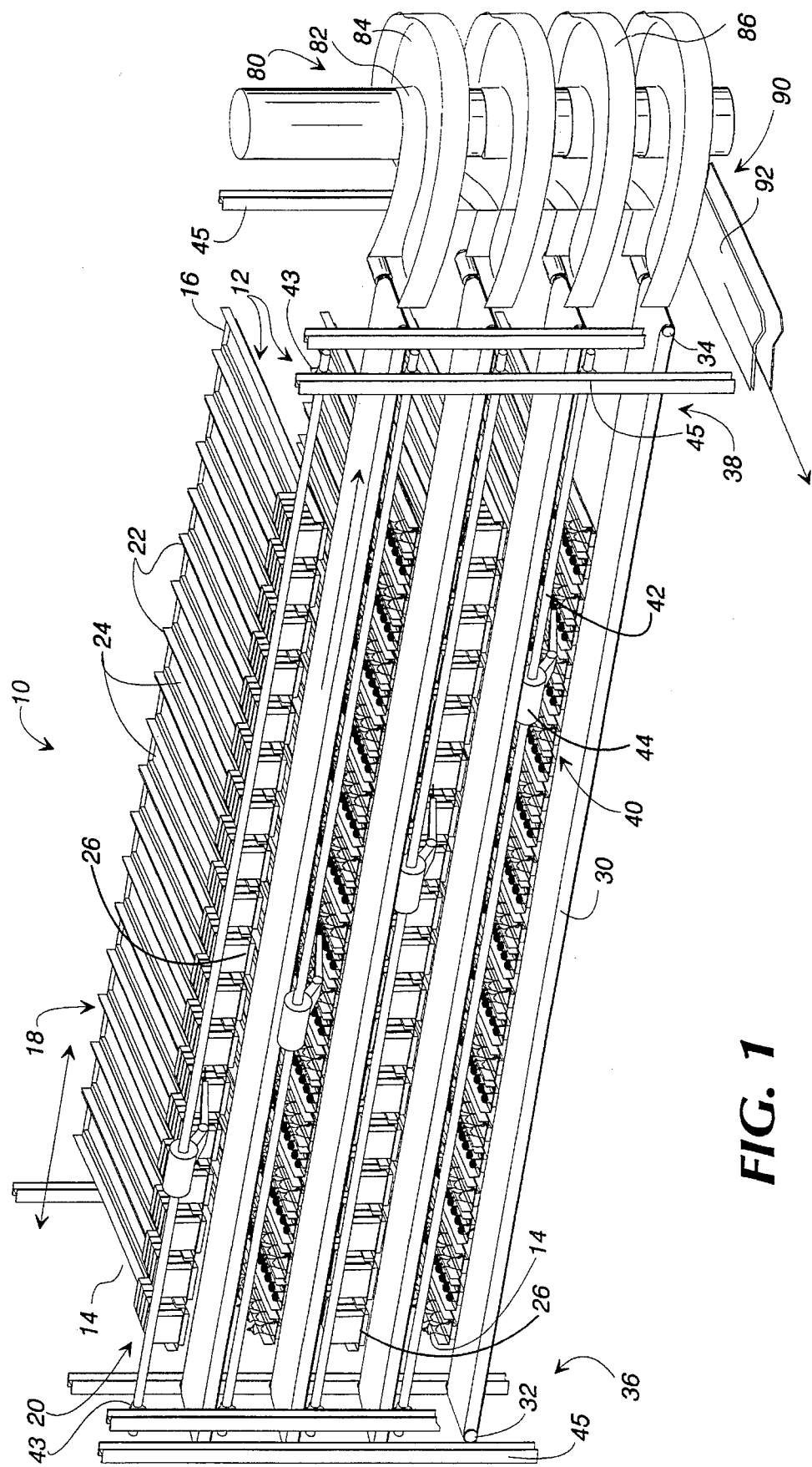
FIG. 1 is a perspective view of an article selecting and collecting apparatus according to the present invention.

Referring now in more detail to the drawings in which like numerals indicate like parts throughout the several views, FIG. 1 illustrates a perspective view of an article selecting and collecting apparatus 10 according to the present invention. The article selecting apparatus includes a plurality of vertically spaced ramps 12, four of which are illustrated in FIG. 1. In this embodiment, the ramps 12 are vertically spaced apart to define article receiving areas 14 between adjacent ramps. The ramps 12 are preferably elongated metal sheets 16 mounted at an angle to taper downwardly from a loading side 18 to a removal side 20. The sheets 16 support a plurality of trays 22 that separate each of the ramps 12 into a plurality of channels 24 for receiving articles in the areas 14. In an alternate embodiment (not illustrated), the channels 24 are defined by dividers that are selectively positionable so that the width of the channels 24 can be set differently to accommodate articles of different widths. The removal sides 20 of the trays 22 are closed by stops 26 that extend upwardly, for a purpose discussed below. The trays 22 are discussed in more detail below.

A continuous conveyor 30 is disposed adjacent each of the ramps 12. Each of the conveyors 30 travels in a horizontal plane around conventional spaced-apart sprocket rollers 32 and 34. One of the sprocket rollers is connected to a drive motor 35 in a conventional manner. The conveyors 30 extend along the length of the shelf 12 from a first end 36 to a second end 38.

Adjacent each ramp 12 is a selector mechanism 40 which is disposed above the respective conveyor 30. The selector mechanism 40 comprises an elongate tubular member 42, also referred to as a rail, mounted conventionally in bearings 43 at distal ends for axial rotation by a motor (not illustrated). A slide 44 slidingly engages the cylindrical member 42 for longitudinal movement relative to the member from the first end 36 to the second end 36. Support frame members 45 are conventional and several are shown for purposes of illustration.

Details of the selector mechanism 40 are better illustrated in perspective cut-away view in FIG. 2. The selector mechanism 40 comprises the elongate tubular member 42 having a slot 46 that extends substantially the length of the member 42. A screw rod 50 is disposed along the longitudinal axis of the cylinder member 42. The longitudinal ends of screw rod 50 are unthreaded and are supported in conventional bearings (not illustrated) for rotation. One end of each the screw rods 50 is connected to a stepper motor (not illustrated) for selective axial rotation of the screw rod for a purpose discussed below. The slide member 44 is slidingly received on the tubular member 42 for longitudinal travel from a first end 47 to a second end 48. An arm 51 attaches to the slide member 44. The arm 51 includes an upper arm 52 and a forearm 54 pivotably coupled at an elbow 56 for movement of the forearm 54 relative to the upper arm 52. The arm 51 includes conventional motors, gears, and cables for manipulating the movement of the forearm 54 relative to the upper arm, as is known to those of ordinary skill in the art. A coupler 58 connects to the upper arm 52 and extends through the slot 46. The coupler 58 includes a threaded bore 60 for receiving and engaging the screw rod 50.

A pair of pincher arms 60 extend outwardly of a distal end 62 of the forearm 54. The pincher arms 60 are conventionally connected to devices, such as stepper motors, switches, and cables, housed in the forearm 54 for extending and retracing the arms 60 and for opening and closing a gap 64 between the arms 60. These devices are conventional and are well known to those of ordinary skill in the art. A sensor 70 mounts at the distal end 62 on an upper surface of the forearm 54. The sensor 70 communicates with a controller for a purpose discussed below.

Turning again to FIG. 1, a spiral chute 80 stands at one end 38 of the article selector and collector apparatus 10. A central column 82 supports the spiral chute 80 which includes a guide surface 84 and side walls 86. The side walls 86 include openings 85 adjacent the extent 38 of the conveyors 30. A lower end 90 of the chute 80 connects to a conveyor 92 which extends into a collection area (not illustrated) for a purpose discussed below.

Figure 3:
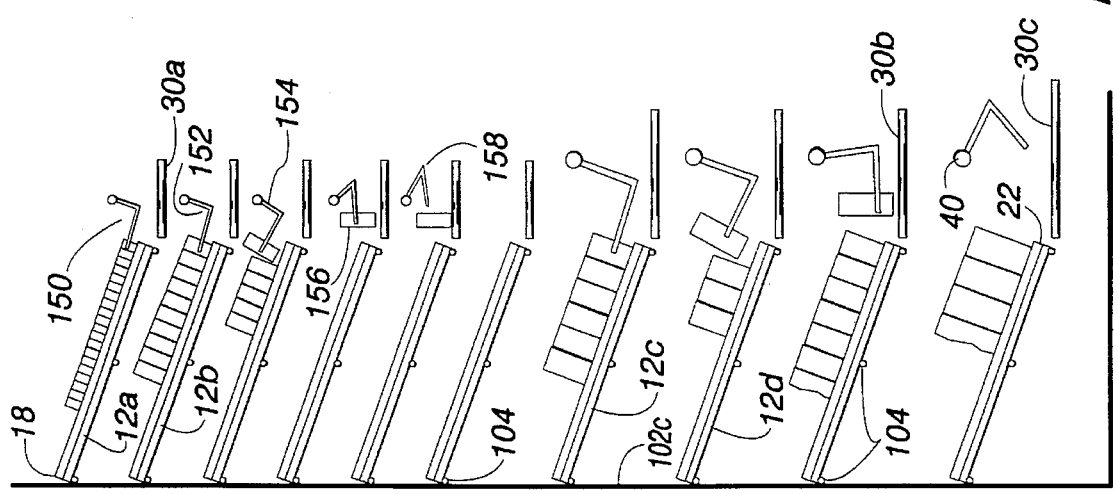
FIG. 3 is an end view of the article selecting and collecting apparatus shown in FIG. 1, to illustrate the operation of the selectors.

FIG. 3 is an end view of the article selecting device 10 shown in FIG. 1, with the support members 104 and 108 substantially removed and the selecting mechanisms 40 in schematic form for purposes of illustration. This illustrated embodiment includes seven ramps 12 for holding articles in the channels 24 defined by the plurality of trays 22 supported on each ramp. The conveyors 30a differ in width from the conveyors 30b and 30c. The narrower articles are positioned in the channels 24 in the upper portions of the article selecting device 10. The vertical spacing of adjacent ramps 12 varies to accommodate articles of different heights on adjacent levels of the ramps, as shown by the difference between the ramps 12a and 12b and ramps 12c and 12d. An aisle generally designated 94 is provided on the loading side 18 for replenishing the articles on the ramps 12. An aisle generally designated 96 is provided on the removing side 20 for access to the selecting mechanisms 40 and the conveyors 30, for maintenance, repair, and the like.

Figure 4:
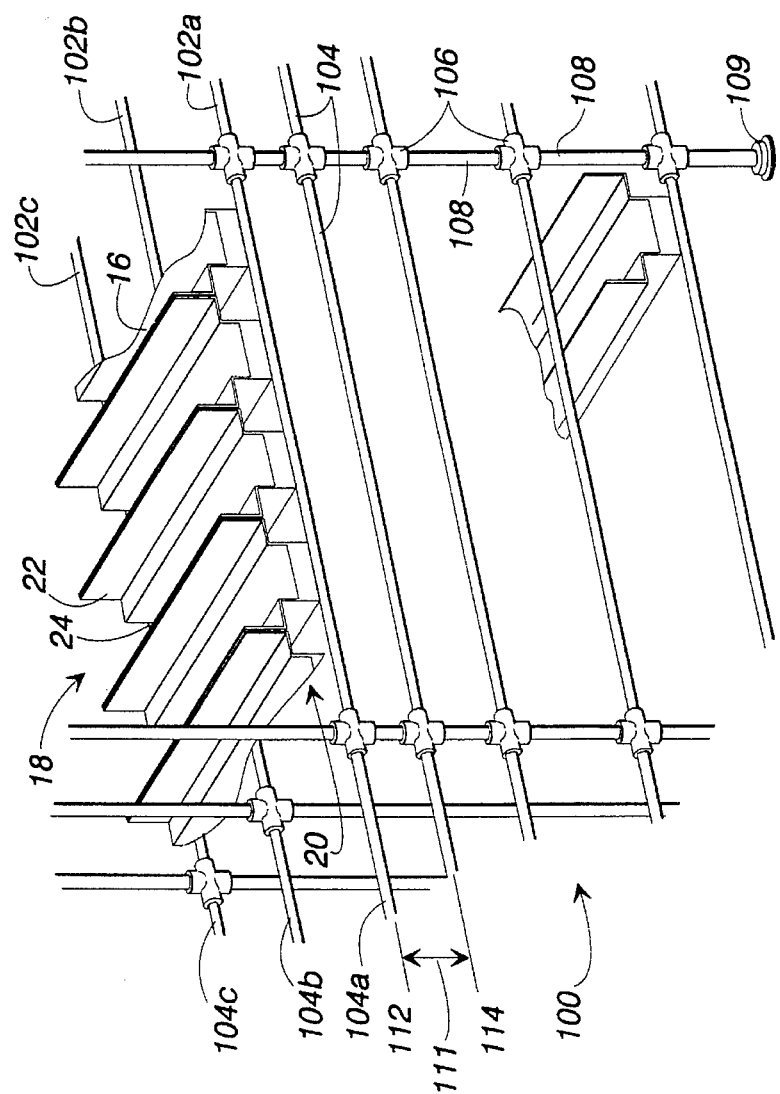
FIG. 4 is a cut-away perspective view of a frame for supporting the article selecting apparatus illustrated in FIG. 1.

FIGS. 3 and 4 illustrate a frame 100 for use with the article selecting apparatus 10 of the present invention. FIG. 4 is a cut-away perspective view of the apparatus 10. The frame 100 comprises three sets 102 of transversely aligned horizontal supports 104 attached by connectors 106 to vertical stanchions 108. The stanchions 108 attach rigidly to a floor support 109 and a ceiling support (not illustrated). The three sets 102 of the supports 104 and the stanchions 108 provide support for a plurality of the sheets 16 and the trays 22 at the loading side 18, at the removing side 20, and in the middle thereof. The middle set 102b provides support medial the ends 18 and 20. As shown in FIG. 3, the supports 104 are vertically offset on the stanchions 108 in the three sets 102 so that the sheets are disposed at an angle tapering downwardly from the loading side 18 to the removing side 20. In the illustrated embodiment, the sheets 16 are oriented at about a 25 degree angle to horizontal. This is accomplished by vertically offsetting the position of the respective horizontal supports 104a, 104b, and 104c on the three sets 102 of frame members. In the illustrated embodiment, the supports 104 and the stanchions 108 are made of sections of pipe having a two-inch diameter. Although not illustrated, cross-members may connect between the stanchions 108 for increased rigidity of the frame 100. Further, the vertical spacing 111 between adjacent horizontal supports 104, such as supports 112 and 114, can be varied to permit the sheets 16 on one level to hold articles of a different height than the trays on the adjacent level.

FIG. 5 illustrates a preferred embodiment of the channel-defining structure comprising the trays 22 that define the channels 22 for holding articles. Three trays are illustrated side-by-side on the supports 104. The trays 22 are substantially U-shaped with a bottom 120 and sides 122. The sides 122 have a lower portion 124 and an upper portion 125 which are connected by an outwardly extending leg 126 between the bottom 120 and an upper edge 128. The leg 126 defines a gap 130 between the sides 122 and the edge of the bottom 120 for insertion of the pincher arms 60 into the tray for removing a selected article.

A hook 132 attaches to a bottom surface of the tray 22 at the loading end 18, as illustrated in a cut-away view. The hook 132 engages the horizontal support 104c for holding the tray 22 in position on the ramp 12. FIG. 5a is a side view of the tray 22 shown in FIG. 5, to better illustrate the hook 132 that secures the tray to the support 104 on the ramp 12. In an alternate embodiment (not illustrated), the trays 22 are rigidly connected with bolts or clips to the horizontal supports 104. The tray 22 includes a front face 134 which defines the stop 26 that stops the articles 135 from sliding off of the tray. The face 134 also receives a coded identifier associated with the articles held in the tray 22, as discussed below.

With reference to FIGS. 1–3, the operation of the article selecting apparatus 10 is described below. The selector mechanisms 40 are positioned at the end 38 of the respective slides 44. The arms 50 are positioned with the sensors 70 facing the respective stop 24. The motors controlling axial rotation of the screw rod 50 are started. As the screw rod rotates, the slide members 44 move longitudinally along the respective tubular members 42. The sensors 70 scan coded indicators attached to each face of the stops 24 in alignment with each channel 24. Each of the coded indicators is a unique identifier associated with articles held in the channels 24. The coded identifier for the articles in one channel is different from the coded identifier for different articles in an adjacent channel. In a preferred embodiment the coded identifier is a conventional bar-code type identifier. The sensor 70 communicates the coded identifier to a controller such as a microprocessor or other computer. The controller includes a memory that maintains a list of articles and coded identifiers. The memory also includes a list of the identifiers of articles to be selected for collecting together. The controller compares the coded identifier with the list of articles to be selected. When the controller determines that the channel 24 holds articles to be selected, the selector mechanism 40 is operated.

The operation of the selector mechanism is best understood in reference to FIGS. 2 and 3. The pincher arms 60 are opened by conventional mechanisms known to persons of ordinary skill in the art creating the gap 64 between the ends of the pincher arms. As shown at 150, the pincher arms 60 are then extended outwardly of the distal end 62 of the forearm 54, thereby placing the pincher arms 60 around the article against the stop 26 at the removal side 20. The pincher arms 60 are moved together to close the gap 64 and to bring the pincher arms firmly against the article. As shown at 152, the stepper motor connected to the tubular member 42 operates causing the arm mechanism 40 to rotate upwardly in a first direction. This lifts the article off of the shelf 12 and out of the channel 24 as shown at 154. Articles remaining in the channel slide downwardly to position the next article at the removal side 20 against the stop 26. The tubular member 42 is rotated sufficiently for the arm 51 and the article to clear the remaining articles. The motor driving the tubular member stops and then reverses. As shown at 156, the arm 70 moves in a second direction carrying the article from above the slide 12 toward the conveyor 30. As the slide 44 rotates, the forearm 54 pivots about the elbow 56 to maintain the article in a upright position with the article above the conveyor 30, the pincher arms 60 open to place the article on the conveyor. The slide 44 continues to rotate (see 158) and the forearm 54 continues to pivot at the elbow 56 with respect to the upper arm 52. This withdraws the forearm 54 away from the article on the conveyor 30 that moves the article to the spiral chute 80. If more than one of the articles is to be collected, the arm mechanism 40 is operated as discussed above, until the required number of articles are removed from the channel 24 and placed on the conveyor 30.

The stepper motor that rotates the screw rod 50 is operated again to move the arm 40 longitudinally on the slide 44 to the next channel 24. The process is thereafter repeated with the sensor 70 communicating the coded identifier to the controller for determining whether the article is to be selected, selected up and placed on the conveyor 30. In a preferred embodiment, the sensor 70 is a conventional light emitting device which scans a bar code displayed on the face of the stop 26.

This process is repeated by each selector mechanism 40 each of the ramps 12. Each selector mechanism 40 makes a single pass from one end 38 of the apparatus 10 to the other end 36 selecting articles during the travel as discussed above. If multiple quantities of an article are ordered by the customer, for example, three cans of a soup, the retrieval action of the selecting mechanism 40, as discussed above, is repeated until the supply of articles in the channel 24 is exhausted or the required quantity is placed on the conveyor.

The selected articles are placed by the selector mechanisms 40 on the respective conveyor belt 30. As illustrated in FIG. 1, the conveyors 30 carry the articles to the spiral chute 80. The articles pass through the respective openings 88 in the wall 86 of the spiral chute 80 and travel downwardly to the collection area at the lower end 90 of the spiral chute 80 for gathering with other selected articles for pickup by the customer.

Figure 6:
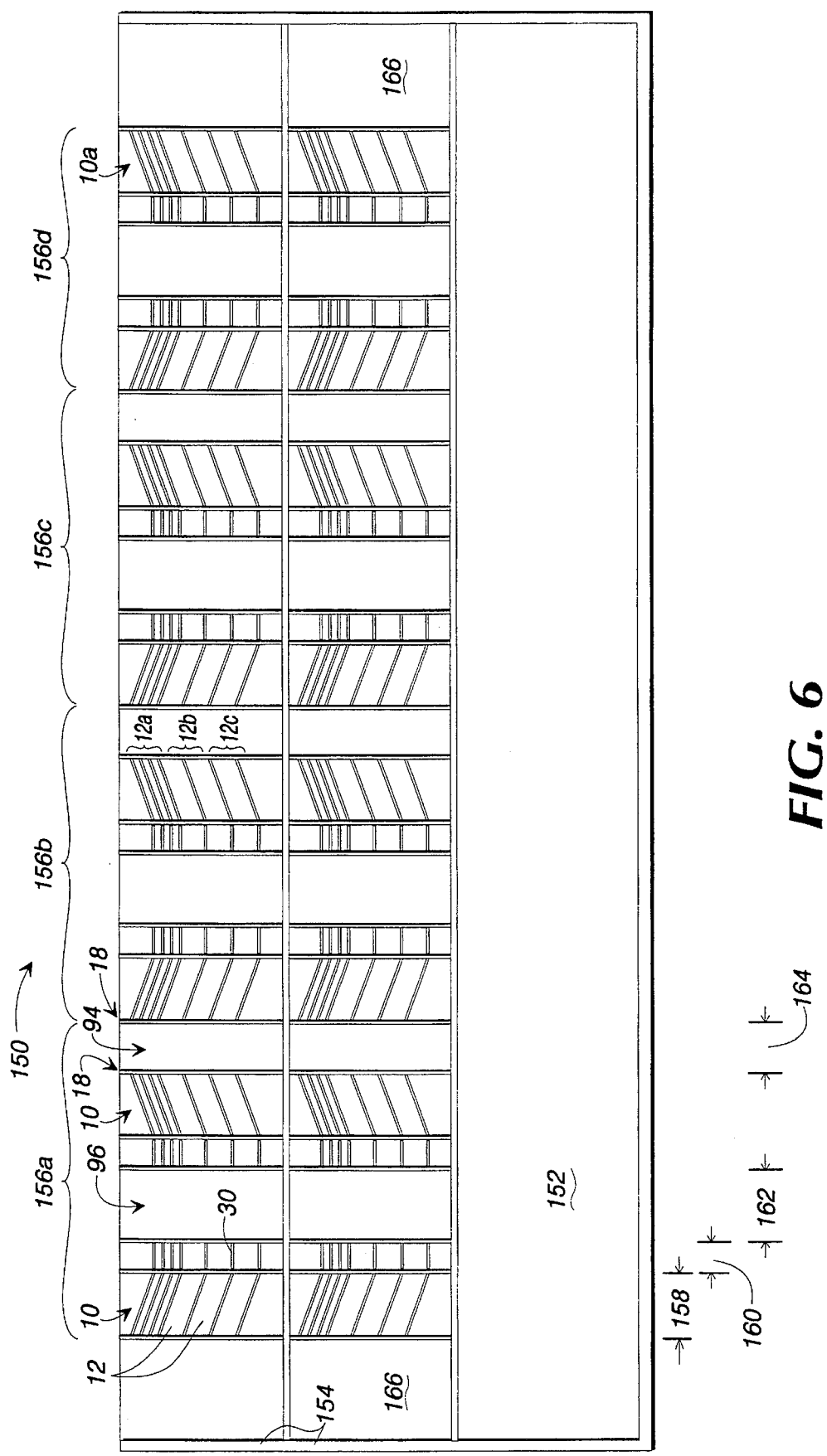
FIG. 6 is a cross-sectional end view of a shopping facility that includes collecting apparatus illustrated in FIG. 1.

FIG. 6 is a cross-sectional end view of a shopping facility, or building, generally designated 150 that includes a plurality of the collecting apparatus 10 illustrated in FIG. 1. It is contemplated that the apparatus of the present invention will be preferably used in supermarkets, and the discussion below is related to such. However, other retail and distribution facilities will benefit from the apparatus and method of the present invention. The building 150 in the illustrated embodiment has three floors. A main floor 152 is divided into three sections (not illustrated) for a consumer order center, a perishable articles section for articles such as fruits and vegetables, and a non-perishable section for other ventures such as a bank, a pharmacy, a video rental service, and the like. Two other floors 154 above the main floor 152 contain the article selecting and collecting apparatus 10 discussed above. Although not illustrated, additional floors may be provided for storage areas, heat, ventilation, and cooling apparatus, and the like.

In a preferred embodiment, the article selecting and collecting apparatus 10 are used in pairs generally designated 156, with four pairs 156a–d illustrated on each floor 154. Each apparatus 10 in the pair face each other and share the aisle 96 commonly between them. The aisle 96 provides access for servicing and maintaining the selector mechanisms 40 (not illustrated) and the conveyors 30. The aisles 94 are provided on the loading sides 18 of each of the article and collecting apparatus 10. These aisles provide access for replenishing the supply of articles held in the trays 22 on the ramps 12. In the illustrated embodiment, the width 158 of the ramps is five feet. The conveyors 30 and the selector mechanisms 40 occupy a space with a width 160 of two feet wide. The aisles 94 and 96 have widths 162 and 164, respectively, of four feet. Each pair 156 of apparatus 10 occupy a width of 22 feet. A platform 166 of 20 feet in width extends around the perimeter of the building 150 for storage and access. The final pair 156*d* of the apparatus 10 occupy 18 feet in width, as the platform 166 adjacent the apparatus 10*a* on the end provides aisle 94 access for loading the end apparatus 10*a*. The supermarket, or other facility, using the apparatus 10 thereby may be placed on a smaller lot, as the building 150 uses vertical space instead of being on a single horizontal floor.

In the illustrated embodiment, the apparatus 10 include seven ramps 12. The upper four ramps 12*a* are spaced eight inches apart. The ramps 12*b* are fourteen inches apart, and the ramp 12*c* is spaced twenty inches away. These spacings may be adjusted to meet the particular requirements of the supermarket or other facility.

A consumer uses the apparatus 10 of the present invention by providing a list of the articles to be selected. In a preferred embodiment, the controller is accessed by the consumer through a computer terminal located in a private booth on the main floor 152. After providing appropriate identification and authorization to the controller, the consumer interacts with the controller to generate a list of the articles to be selected. In a preferred embodiment, the controller is a conventional microprocessor computer, or the like. The list of articles to be selected is generated by the controller displaying on a monitor the categories of articles available. The controller may also selectively produce a listing of the previous order of the particular consumer. The listing may be displayed on a video terminal or printed. Upon selective inquiry by the consumer, the controller provides other pertinent details for each product, such as size, weight, restrictions, if any, descriptions of nutrition information, and pricing. The consumer uses an input mechanism to instruct the controller as to purchases. Such input devices include mouse, directional stick, touch screen entry, or other conventional input mechanism for microprocessors.

The controller compiles each individual order as instructed by the consumer. The controller then instructs the selecting mechanisms 40 to retrieve the selected items from the particular storage ramps. In a preferred embodiment, there are seven ramps in each article selecting and collecting apparatus 12. Once the consumer has finalized the list of articles to be selected, the controller places the order in sequence for completion. The selector mechanisms 40 move along the respective slides 44 selecting and removing the selected items from the ramps 12 onto the adjacent conveyor 30. The selected articles move to the spiral chute 80 which directs the articles to the packaging and delivery section. The complete shopping list with costs and a packing number is generated. The consumer goes to the collection area and picks up the collected articles with the printed list of articles and a receipt for payment.

It is thus seen that an article selecting and collecting apparatus is provided for improving the activity of shopping, particularly for perishable and non-perishable articles. While this invention has been described in detail with particular reference to the preferred embodiment thereof, it should be understood that many modifications, additions and deletions may be made thereto without departure from the spirit and scope of the invention as set forth in the appended claims.

What is claimed is:

1. An article selecting and collecting apparatus, comprising:

a frame of laterally-aligned pairs of vertical stanchions and vertically-spaced horizontal supports, the stanchions and supports interconnected to define a plurality of vertically spaced ramps, the aligned pairs of horizontal supports in each ramp vertically offset with respect to each other;

a plurality of article-holding channels disposed on the supports of each ramp, whereby the channels slope from a loading side to a removal side, each channel including side walls, a bottom for supporting articles in the channel, and a stop that extends upwardly from the bottom at the removal side for restricting articles from sliding out of the channel;

a continuous conveyor disposed horizontally adjacent each ramp;

a rail extending longitudinally adjacent each ramp and spaced apart from the respective conveyor;

an articulated picker slidingly attached to each rail;

a spiral chute attached at one end of the frame and including openings in a side wall for communication with the conveyors, the spiral chute connecting to a collector at a lower end of the spiral chute; and means for operating a selected picker to slide longitudinally on the respective rail to a selected portion of the ramp to retrieve an article from one of the channels and place the article on the respective conveyor, whereby selected articles, being placed on the respective conveyor by the picker and carried to the chute, travel to the collector for the gathering with other selected articles.

2. The article selecting and collecting apparatus as recited in claim 1, wherein the article-holding channels comprise:

an elongated sheet attached to the respective supports; a plurality of spaced-apart dividers received on the sheet; and a stop extending upwardly at a removal edge of the channel, whereby the dividers separate the sheet into article-holding channels.

3. The article selecting and collecting apparatus as recited in claim 1, wherein the article-holding channel comprises:

a tray having a bottom, a pair of upwardly extending side walls, and a stop extending upwardly from an edge of the bottom; and means for attaching the tray to the supports.

4. The article selecting and collecting apparatus as recited in claim 3, wherein the attaching means comprises a curved hook attached to a bottom surface of the tray at an edge distal from the stop, whereby the hook engages the respective horizontal support for holding the tray to the supports.

5. The article selecting and collecting apparatus as recited in claim 1, wherein the operating means comprises:

an elongated screw disposed along a longitudinal axis of the rail;

a motor to selectively rotate the screw axially;

an arm connected to the picker and having an threaded bore that engages the screw, whereby the screw, being axially rotated, drives the picker longitudinally relative to the rail.

\* \* \* \* \*